United States Patent
Messerschmidt et al.

(10) Patent No.: US 7,240,965 B2
(45) Date of Patent: Jul. 10, 2007

(54) FITTING SYSTEM FOR A VEHICLE SEAT

(75) Inventors: Rainer Messerschmidt, Düsseldorf (DE); Rolf Schüler, Heiligenhaus (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 11/267,872

(22) Filed: Nov. 4, 2005

(65) Prior Publication Data

US 2006/0061197 A1   Mar. 23, 2006

Related U.S. Application Data

(63) Continuation of application No. PCT/EP2004/005267, filed on May 17, 2004.

(30) Foreign Application Priority Data

May 23, 2003   (DE) ................ 103 23 450

(51) Int. Cl.
*A47C 1/02* (2006.01)
*B60N 2/02* (2006.01)
(52) U.S. Cl. ............... 297/344.15; 297/361.1; 297/325
(58) Field of Classification Search ........... 297/344.15, 297/452.18, 361.1, 325
See application file for complete search history.

(56) References Cited

U.S. PATENT DOCUMENTS

| | | | |
|---|---|---|---|
| 5,452,938 A | 9/1995 | Ernst | |
| 6,220,669 B1 * | 4/2001 | Frohnhaus et al. | 297/452.18 |
| 6,332,649 B1 | 12/2001 | Vossmann | |
| 6,454,354 B1 | 9/2002 | Vossmann et al. | |
| 6,540,297 B2 | 4/2003 | Hänsel et al. | |
| 6,715,832 B2 | 4/2004 | Dill | |
| 6,722,739 B2 | 4/2004 | Klein et al. | |
| 6,742,844 B2 | 6/2004 | Pollack | |
| 6,742,845 B2 | 6/2004 | Nock | |
| 6,749,263 B2 | 6/2004 | Peters | |
| 6,799,806 B2 | 10/2004 | Eppert et al. | |
| 6,840,579 B2 | 1/2005 | Klein et al. | |
| 6,918,635 B2 | 7/2005 | Finner et al. | |
| 2002/0043847 A1 | 4/2002 | Dill et al. | |
| 2002/0050733 A1 | 5/2002 | Hänsel et al. | |
| 2002/0170381 A1 | 11/2002 | Hänsel et al. | |
| 2004/0075325 A1 | 4/2004 | Assmann et al. | |
| 2004/0130199 A1 | 7/2004 | Armbrust et al. | |
| 2005/0017562 A1 | 1/2005 | Lehmann et al. | |

FOREIGN PATENT DOCUMENTS

| | | |
|---|---|---|
| DE | 100 52 092 A1 | 5/2002 |
| DE | 201 20 768 U1 | 6/2002 |

(Continued)

*Primary Examiner*—Milton Nelson, Jr.
(74) *Attorney, Agent, or Firm*—Womble Carlyle Sandridge & Rice, PLLC

(57) ABSTRACT

In the case of a fitting system for a vehicle seat (1), in particular for a motor vehicle seat, having at least one fitting (15, 35, 45) and a structural part (11) on which the fitting (15) is to be fixed, the fitting parts are substantially disk-shaped, can be rotated relative to each other, are axially held together by a clutch ring (19) arranged along the periphery, and the clutch ring (19) is designed in a manner such that it is integrated in the structural part (11).

20 Claims, 2 Drawing Sheets

FOREIGN PATENT DOCUMENTS

| | | |
|---|---|---|
| DE | 101 02 860 A1 | 8/2002 |
| DE | 101 05 282 A1 | 8/2002 |
| DE | 101 20 854 C1 | 8/2002 |
| DE | 101 18 358 A1 | 10/2002 |
| DE | 101 35 433 C1 | 10/2002 |
| DE | 101 24 618 A1 | 12/2002 |
| DE | 101 43 403 A1 | 3/2003 |
| DE | 101 44 832 A1 | 3/2003 |
| DE | 101 44 840 A1 | 3/2003 |
| DE | 101 48 375 A1 | 4/2003 |
| DE | 102 03 006 A1 | 8/2003 |
| DE | 102 14 453 A1 | 10/2003 |
| DE | 102 42 950 A1 | 3/2004 |
| DE | 102 60 581 A1 | 7/2004 |
| EP | 0 068 960 B1 | 1/1983 |
| EP | 0 556 364 B1 | 8/1993 |
| FR | 2 305 633 | 10/1976 |
| WO | WO 00/44582 | 8/2000 |

* cited by examiner

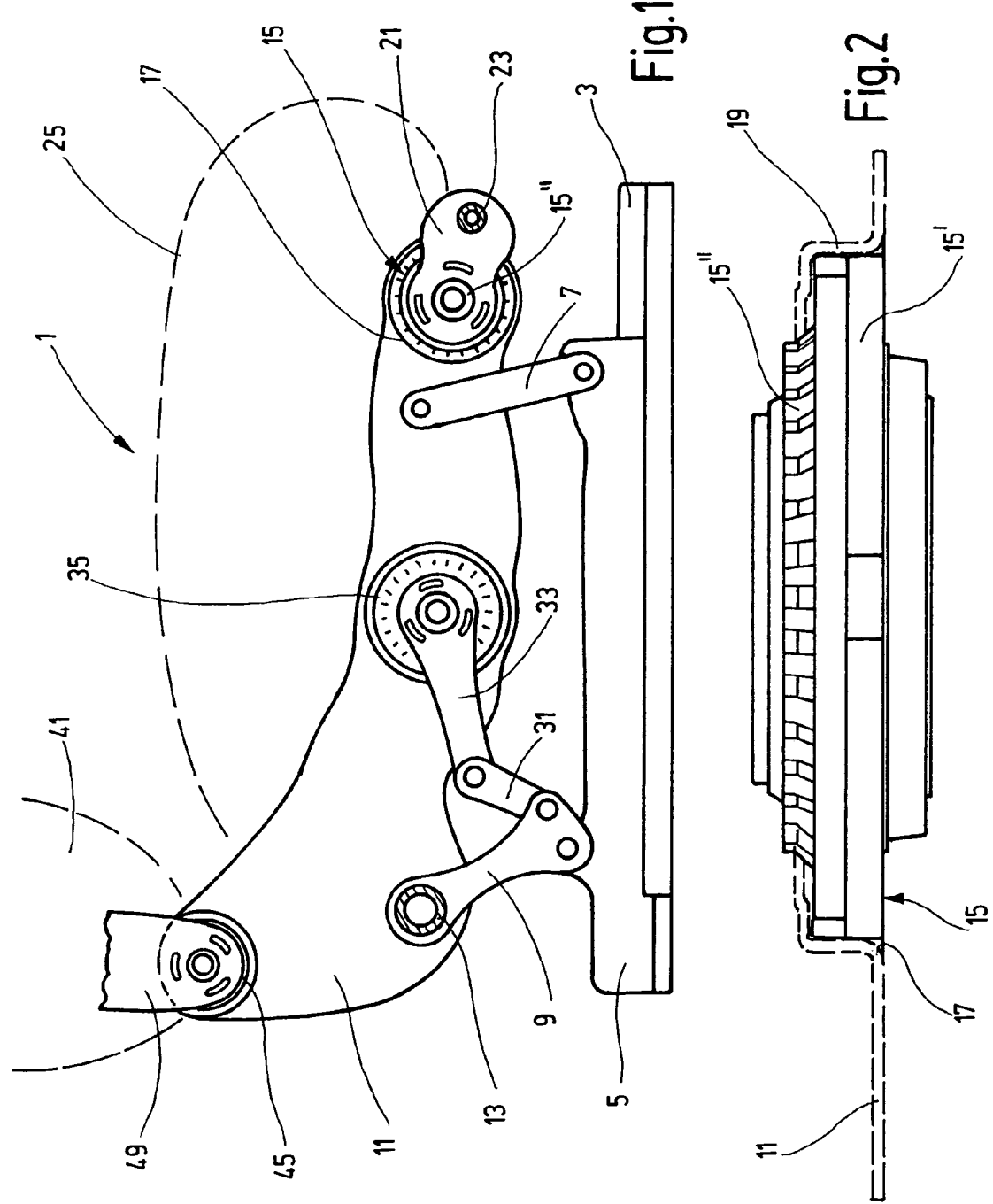

FITTING SYSTEM FOR A VEHICLE SEAT

CROSS-REFERENCE TO RELATED APPLICATION

The present application is a continuation of International Application PCT/EP2004/005267, which was filed May 17, 2004. The disclosure of PCT/EP2004/005267 is incorporated herein by reference, in its entirety.

BACKGROUND OF THE INVENTION

The present invention relates to a fitting system for a vehicle seat, in particular for a motor vehicle seat, having at least one fitting and a structural part on which the fitting is to be fixed, with the fitting parts of the fitting being substantially disk-shaped, rotatable relative to each other, and axially held together by a clutch ring arranged along the fitting's periphery.

DE 101 05 282 A1 and corresponding U.S. Pat. No. 6,799,806 disclose a fitting system of the type described immediately above, in which a fitting part is pressed into the clutch ring which at the same time clutches the other fitting part and therefore ensures that they are held together axially and radially. DE 101 05 282 A1 and corresponding U.S. Pat. No. 6,799,806 further indicate that the fitting prepared in this manner is then laser-welded to the structural part.

BRIEF SUMMARY OF SOME ASPECTS OF THE INVENTION

An aspect of the present invention is the provision of improvement(s) to a fitting system for a vehicle seat, in particular for a motor vehicle seat, having at least one fitting and a structural part on which the fitting is to be fixed, with the fitting parts of the fitting being substantially disk-shaped, rotatable relative to each other, and axially held together by a clutch ring arranged along the fitting's periphery. In accordance with one aspect of the present invention, the clutch ring is designed in a manner such that it is integrated in the structural part.

Because the clutch ring is designed in a manner such that it is integrated in the structural part, a doubling of material, which is unnecessary for the operability, can be avoided, i.e. a component can be saved. This makes the fitting system more cost effective and reduces the weight. In addition, the assembly of the fitting system is simplified by a process step, which likewise reduces the production costs. In accordance with the present invention, the clutch ring does not have to form a complete circle in the peripheral direction, i.e. it does not have to be continuous. It is also conceivable for the clutch ring to be formed only in the angular region to be passed over.

One of the fitting parts is preferably pressed into the clutch ring and is preferably laser-welded to the structural part, which is also intended to include the possibility of welding it to the clutch ring. With the preferred, integral design, the clutch ring can be designed in a simple manner, for example as a wall region of a receptacle which receives the fitting and thereby holds it together radially. The receptacle can be produced with simultaneous formation of the clutch ring, by deep-drawing or the like. The other fitting part may be accessible, for example, through a cut-out opening in the base of the receptacle, thus making it possible to attach adapters, for example for a crosspiece of the seat frame, for the backrest or for an adjuster drive.

The fitting system according to the invention can be used in principle for all vehicle seats having adjusters, such as seat inclination adjusters, seat height adjusters and/or backrest inclination adjusters. In the present case, it does not matter whether the fitting is designed internally as a latching fitting or a geared fitting.

Other aspects and advantages of the present invention will become apparent from the following.

BRIEF DESCRIPTION OF THE DRAWINGS

The invention is explained in greater detail below with reference to an exemplary embodiment which is illustrated in the drawings, in which:

FIG. 1 shows a view, illustrated in a partially cutaway form, of the inside of the exemplary embodiment at maximum seat height, with the upholstery being indicated by dashed lines, FIG. 2 shows a bottom view, illustrated in partially cutaway form, of the first fitting and of the structural part.

DETAILED DESCRIPTION OF EXEMPLARY EMBODIMENTS

Figure 3:
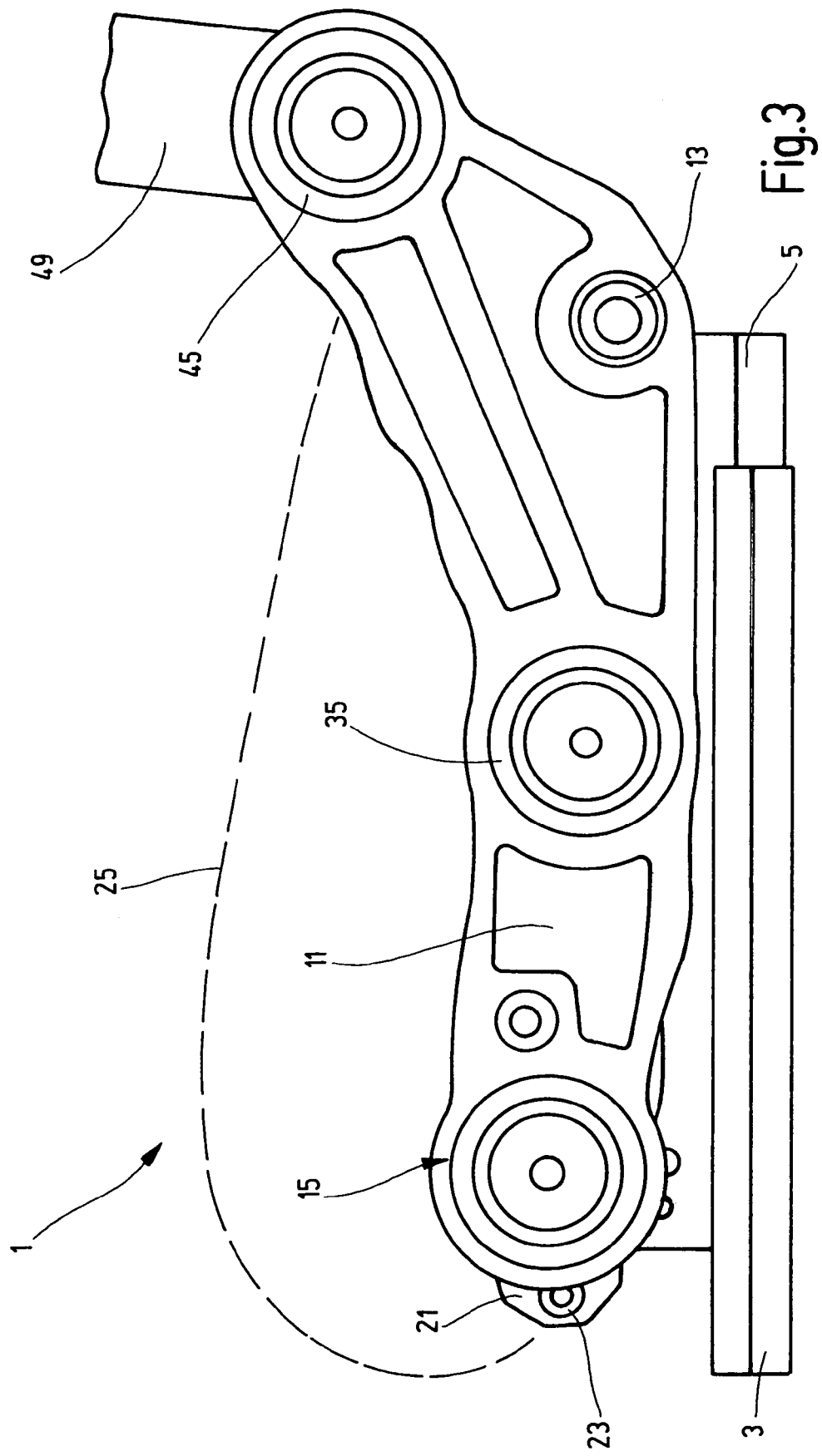
FIG. 3 shows a view of the outside of the exemplary embodiment at minimal seat height, with the upholstery being indicated by dashed lines.

The exemplary fitting system is provided for a vehicle seat 1 of a motor vehicle. The vehicle seat 1 has, on both sides of the vehicle seat, a first seat rail 3 and a second seat rail 5. The first seat rail 3 is fixed on the vehicle structure, as a guide rail. The second seat rail 5 is a sliding rail which is guided in the first seat rail 3 in a manner such that it can be displaced in the longitudinal direction of the seat. A front rocker 7 is coupled to the front end of the second seat rail 5, and a rear rocker 9 is coupled to the rear end of the second seat rail 5. The front and rear rockers 7 and 9 are also coupled in the region of the front and rear ends of a side part of the seat frame of the vehicle seat 1. The side part of the seat frame of the vehicle seat 1 is referred to in short in the Detailed Description section of this disclosure as structural part 11. The second seat rail 5, the two rockers 7 and 9 and the structural part 11 define a four-bar linkage.

A tubular, rear crosspiece 13 connects the rear ends of the two structural parts 11 fixedly to each other. The coupling of the rear rocker 9 to the structural part 11 takes place by the fact that the rear rocker 9 is mounted rotatably on the rear crosspiece 13. A first fitting 15 is arranged as a seat inclination adjuster at the front end of the structural part 11 which is on the left side of the vehicle seat 1 in the exemplary embodiment. The first fitting 15 substantially comprises two substantially disk-shaped fitting parts 15' and 15" which can be rotated relative to each other and are held together axially by a central clamping element for transportation and normal use. If the first fitting 15 is designed as a latching fitting, the two fitting parts 15' and 15" can be locked to each other. On the other hand, if the first fitting 15 is designed as a geared fitting, the two fitting parts 15' and 15" are in self-locking geared connection to each other.

A cup-shaped receptacle 17 has a circular cross section and partially recessed base. The cup-shaped receptacle 17 receives the first fitting 15. The cup-shaped receptacle 17 is formed in the structural part 11 by deep-drawing. In this case, the encircling wall region of the receptacle 17 is designed as an integrated clutch ring 19 into which the first fitting part 15' of the first fitting 15 is pressed, so that the first fitting part 15' is fixed in place for normal use. The clutch ring 19 is arranged along the outer periphery of the fitting 15 or the two fitting parts 15' and 15", i.e. radially on the outside with respect to the two fitting parts 15' and 15". The second fitting part 15", which is introduced first of all into the receptacle 17, remains freely rotatable and protrudes partially through the cut-out opening in the base of the receptacle 17, i.e. the clutch ring 19 also holds the two fitting parts 15' and 15" together in the axial direction. For reinforcement purposes, in particular for the absorption and transmission of crash forces, the first fitting part 15' and the clutch ring 19, which is formed integrally with the structural part 11, are additionally laser-welded to each other.

On the side facing away from the first fitting part 15', the second fitting part 15" protrudes through the cut-out opening in the base of the receptacle 17. An adapter 21 is welded onto the accessible part of the second fitting part 15" that protrudes through the cut-out opening in the base of the receptacle 17.

In accordance with the exemplary embodiment, instead of a first fitting 15 being arranged on the structural part 11 on the right side of the vehicle seat 1, a corresponding joint with a corresponding adapter and a compensating spring is arranged on the structural part 11 on the right side of the vehicle seat. The two adapters are connected fixedly to each other by a tubular, front crosspiece 23. The two structural parts 11 and the two crosspieces 13 and 23 together define an encircling seat frame. A seat shell (not illustrated) is fitted between the two crosspieces 13 and 23 and bears a seat cushion 25 (illustrated by dashed lines in the drawings). The inclination of the seat cushion 25 and therefore the inclination of the seat surface can be adjusted by a pivoting movement of the first fitting 15.

A first lever 31, to which, in turn, a second lever 33 is coupled, is coupled to the rear rocker 9. Approximately in the center of the left structural part 11, a second fitting 35, which is designed like the first fitting 15, is arranged as the seat height adjuster. As in the case of the first fitting 15, the second fitting 35 is received by a receptacle formed in the structural part 11, with the encircling wall region being designed as a clutch ring into which the first fitting part of the second fitting 35 is pressed and to which the first fitting part of the second fitting 35 is laser-welded. The second lever 33 is fixed on the second fitting part of the second fitting 35 in the same manner as the adapter 21 is fixed on the first fitting 15. A pivoting movement of the second fitting 35 causes, via the lever mechanism consisting of the two levers 31 and 33, the rear rocker 9 to be moved, as a result of which the four-bar linkage is set upright or lowered, i.e. the height of the seat cushion 25 and therefore of the seat surface is adjusted.

The backrest 41 is arranged at the rear end of the structural part 11. A third fitting 45, which is designed like the two other fittings 15 and 35, is provided for the backrest inclination adjustment. Like the two other fittings 15 and 35, the third fitting 45 is received by a receptacle formed in the structural part 11, with the encircling wall region being designed as a clutch ring into which the first fitting part of the third fitting 45 is pressed and to which the first fitting part of the third fitting 45 is laser-welded. A backrest adapter 49 is fixed on the second fitting part of the third fitting 45 in the same manner as the adapter 21 is fixed on the first fitting 15. The structure of the backrest 41, i.e. the backrest frame, is fixed on the backrest adapter 49. As an alternative, the backrest frame may also be directly fixed on this second fitting part of the third fitting 45. The backrest 41 is adjusted in its inclination by a pivoting movement of the third fitting 45.

When the structural part 11 is produced from rolled steel sheet, the rolls that the steel sheet passes between can be moved perpendicularly with respect to the longitudinal direction in accordance with the "rolled blanks" principle. The longitudinal direction is defined by the direction of movement of the sheet passing between the rolls. The perpendicular movement of the rolls can be carried out in such a manner that the material thickness of the steel sheet is not homogeneous, but rather changes along the longitudinal length of the steel sheet. This results in the simplest case in a wedge-shaped profile in the longitudinal direction. However, it is also possible for approximately wave-shaped profiles or small discontinuities to be produced. In accordance with the exemplary embodiment of the present invention, the shape is selected in such a manner that, when the structural part 11 is punched out, the regions having the clutch rings 19 (i.e. the receptacles 17 with their edge regions) have a greater material thickness, if appropriate also as far as the edge of the structural part 11, while the further regions of the structural part 11 (i.e. the regions between the receptacles 17) are formed with a smaller material thickness, in each case with a continuous material thickness transition in between. With the (locally) greater material thickness, in the event of a crash the forces can be better absorbed and passed on.

In one modified embodiment of the present invention, the backrest adapter or backrest frame is used as the structural part on which the receptacle for the third fitting 45 is formed, with the first fitting part being pressed into the integrated clutch ring of the receptacle and being laser-welded to it, whereas the second fitting part is fixed on the seat-frame side part.

The "rolled blanks" principle may also be used in the modified embodiment to form the region with the clutch ring for the third fitting 45, i.e. the lower end of the backrest frame, with a greater material thickness which decreases continuously to the upper end of the backrest frame.

It will be understood by those skilled in the art that while the present invention has been discussed above with reference to exemplary embodiments, various additions, modifications and changes can be made thereto without departing from the spirit and scope of the invention as set forth in the following claims.

What is claimed is:

1. A fitting system for a vehicle seat, the fitting system comprising:
    at least one fitting, wherein the fitting includes first and second fitting parts that are substantially disk-shaped; and
    a structural part having a cup-shaped receptacle, wherein the cup-shaped receptacle includes an at least partially encircling wall region that defines a clutch ring formed integrally with the structural part, wherein
    the cup-shaped receptacle is in receipt of the fitting,
    the first and second fitting parts are axially held together by the clutch ring,
    there can be relative rotation between the first and second fitting parts,
    the receptacle includes a base,
    the base includes an opening, and
    the second fitting part is accessible through the opening in the base of the receptacle.

2. The fitting system as claimed in claim 1, wherein the structural part's material thickness is greater at the clutch ring than in other regions of the structural part.

3. The fitting system as claimed in claim 1, wherein the fitting is a latching fitting or a geared fitting.

4. The fitting system as claimed in claim 1, wherein the structural part is a side part of a seat frame of the vehicle seat.

5. The fitting system as claimed in claim 1 in combination with the vehicle seat, wherein the fitting is operative for adjusting at least a portion of the vehicle seat.

6. The combination as claimed in claim 5, wherein the adjusting is selected from the group consisting of:
adjusting inclination of a seat cushion of the vehicle seat, adjusting the vehicle seat's height, and
adjusting inclination of the vehicle seat's backrest.

7. The fitting system as claimed in claim 1, wherein the receptacle is deep drawn.

8. The fitting system as claimed in claim 7, wherein the structural part's material thickness is greater at the clutch ring than in other regions of the structural part.

9. The fitting system as claimed in claim 1, wherein the first fitting part is pressed into the clutch ring.

10. The fitting system as claimed in claim 9, wherein the structural part's material thickness is greater at the clutch ring than in other regions of the structural part.

11. The fitting system as claimed in claim 9, wherein the structural part is a side part of a seat frame of the vehicle seat.

12. The fitting system as claimed in claim 9, wherein the first fitting part is laser-welded to the structural part.

13. The fitting system as claimed in claim 12, wherein the structural part is a side part of a seat frame of the vehicle seat.

14. A vehicle seat, comprising:
a seat frame having a side part that includes a front end and a rear end, wherein the side part has a cup-shaped receptacle;
a backrest, a front crosspiece, a rear cross piece and a seat cushion that is carried by the front and rear crosspieces, wherein the front crosspiece is connected to the side part proximate the front end of the side part, the rear crosspiece is connected to the side part proximate the rear end of the side part, and the backrest is connected to the side part proximate the rear end of the side part; and
a fitting system that is operative for adjusting at least a portion of the vehicle seat, wherein
the fitting system comprises the cup-shaped receptacle and at least one fitting,
the fitting includes first and second fitting parts that are substantially disk-shaped,
the cup-shaped receptacle includes an at least partially encircling wall region that defines a clutch ring formed integrally with the side part,
the cup-shaped receptacle is in receipt of the fitting,
the first and second fitting parts are axially held together by the clutch ring, and
there can be relative rotation between the first and second fitting parts.

15. The vehicle seat as claimed in claim 14, wherein the receptacle is defined in the side part at a position that is proximate the front end of the side part, and the front crosspiece being connected to side part is by way of the receptacle.

16. The vehicle seat as claimed in claim 14, wherein the receptacle is defined in the side part at a position that is proximate the rear end of the side part, and the backrest being connected to side part is by way of the receptacle.

17. The vehicle seat as claimed in claim 14, wherein the receptacle includes a base, the base includes an opening, and the second fitting part is accessible through the opening in the base of the receptacle.

18. The vehicle seat as claimed in claim 14, wherein the side part's material thickness is greater at the clutch ring than in other regions of the side part.

19. A fitting system for a vehicle seat, the fitting system comprising:
at least one fitting, wherein the fitting includes first and second fitting parts that are substantially disk-shaped; and
a structural part having a cup-shaped receptacle, wherein
the cup-shaped receptacle includes an at least partially encircling wall region that defines a clutch ring formed integrally with the structural part,
the cup-shaped receptacle is in receipt of the fitting,
the first and second fitting parts are axially held together by the clutch ring,
there can be relative rotation between the first and second fitting parts,
the structural part is a side part of a seat frame of the vehicle seat,
the fitting is a first fitting,
the receptacle is a first receptacle,
the wall region is a first wall region,
the clutch ring is a first clutch ring,
the side part includes at least both the first receptacle and a cup-shaped second receptacle,
the second receptacle includes an at least partially encircling wall region that defines a second clutch ring formed integrally with the side part of the vehicle seat's seat frame,
the fitting system further includes at least a second fitting,
the second fitting includes fitting parts that are substantially disk-shaped,
the second receptacle is in receipt of the second fitting,
the fitting parts of the second fitting are axially held together by the second clutch ring, and
there can be relative rotation between the fitting parts of the second fitting.

20. The fitting system as claimed in claim 19, wherein the first receptacle includes a base, the base includes an opening, and the second fitting part of the first fitting is accessible through the opening in the base of the receptacle.

* * * * *